Aug. 30, 1932.   W. O. MacKEY   1,875,067
SPLASH PREVENTING DEVICE FOR MOTOR CARS
Filed April 23, 1931

W. O. Mackey
INVENTOR

Patented Aug. 30, 1932

1,875,067

UNITED STATES PATENT OFFICE

WASHINGTON OTTO MAC KEY, OF DJURSHOLM, SWEDEN

SPLASH PREVENTING DEVICE FOR MOTOR CARS

Application filed April 23, 1931, Serial No. 532,319, and in Sweden July 2, 1928.

This invention has for its object to improve the splash preventing device claimed in the U. S. Patent No. 1,669,138, issued May 8th, 1929.

The flexible shield in said original form of the device is particularly adapted to be bent freely towards the rim or felloe of the wheel if necessary but to be supported at the opposite side to prevent bending of the same from the rim of the wheel. The shield is normally attached to the inside of the support ring, which is concentrically and closely fixed to the felloe and extending about to the middle of the ring from the wheel center counted.

However, experiments have shown, that the shield ought to have a certain mobility also in direction from the wheel rim especially at pneumatic (balloon) tyres in order to be able to turn in said direction. According to this invention the support ring is arranged in such a way that a circular part, counted from the free edge, is divided into segments, to which the shield is attached and which are pivoted to the remaining part of the support ring so that they can be turned to and fro the felloe and thus the support ring in a certain degree becomes yielding to the press of the shield if the tyre itself, for instance due to puncture, should begin to act upon the shield.

Figure 1:
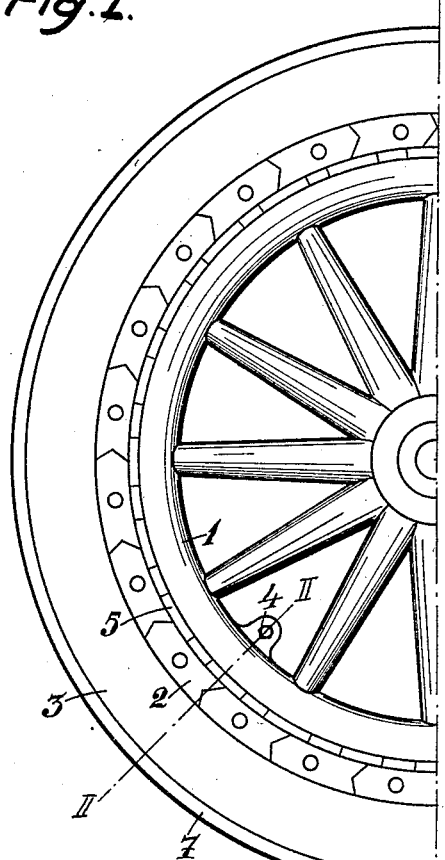
Figure 2:
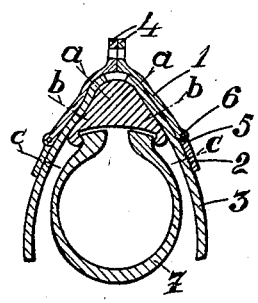

How the splash device according to this invention may be embodied is shown in the accompanying drawing, wherein Fig. 1 is a side view of one half of a wheel provided with this device, and Fig. 2 a section on line II—II in Fig. 1.

The support ring is indicated by 1, the segments by 2 and the shield by 3. One support ring is attached to each side of the felloe 7 and both are fixed by means of bolts located in projections 4 on each support ring 1.

The segments 2 are connected to the remaining part of the support ring by means of hinges and the pivots 6 of said hinges are located so that they touch a common circle drawn up concentrically to the wheel center. By this arrangement it is possible to fix the shield to the support ring in a number of points located on the same radius, for instance at $a$, $b$ and $c$, and nevertheless give the shield a necessary mobility on both sides and also strength, required against pressing in radial direction.

Having now described my invention, what I claim as new and desire to secure by Letters Patent is:

1. Splash preventing device for motor cars including a support ring adapted to be fixed to the felloe of the wheels and a flexible shield attached to the support ring, said support ring being provided with segments, connected to the support ring so that they can be turned to and fro the felloe and become yielding to the action of the tyre if punctured.

2. Splash preventing device for motor cars including a support ring adapted to be fixed to the felloe of the wheels and a flexible shield attached to the support ring, said support ring being provided with segments along its circumference pivoted to the ring so that they can be turned to and fro the felloe, the shield being fixed to these segments too.

3. Splash preventing device for motor cars including two support rings adapted to be fixed one at each side of the felloe by means of bolts located in projections situated on the support rings on the inside of the rim, each support ring being provided with a flexible shield attached to segments pivoted to the support ring along the circumference which segments are turnable to and fro the rim of the wheel.

In witness whereof I have hereunto signed my name.

WASHINGTON OTTO MAC KEY.